US008645131B2

(12) United States Patent
Rao et al.

(10) Patent No.: US 8,645,131 B2
(45) Date of Patent: Feb. 4, 2014

(54) DETECTING SEGMENTS OF SPEECH FROM AN AUDIO STREAM

(76) Inventors: Ashwin P. Rao, Seattle, WA (US); Gregory M. Aronov, Seattle, WA (US); Marat V. Garafutdinov, Seattle, WA (US)

(*) Notice: Subject to any disclaimer, the term of this patent is extended or adjusted under 35 U.S.C. 154(b) by 750 days.

(21) Appl. No.: 12/581,109

(22) Filed: Oct. 16, 2009

(65) Prior Publication Data

US 2010/0100382 A1 Apr. 22, 2010

Related U.S. Application Data

(60) Provisional application No. 61/196,552, filed on Oct. 17, 2008.

(51) Int. Cl.
*G10L 15/02* (2006.01)

(52) U.S. Cl.
USPC .......... 704/233

(58) Field of Classification Search
USPC .......... 704/231–257
See application file for complete search history.

(56) References Cited

U.S. PATENT DOCUMENTS

| | | | | |
|---|---|---|---|---|
| 4,256,924 | A * | 3/1981 | Sakoe | 704/241 |
| 4,805,219 | A * | 2/1989 | Baker et al. | 704/241 |
| 4,897,878 | A * | 1/1990 | Boll et al. | 704/233 |
| 5,526,463 | A * | 6/1996 | Gillick et al. | 704/251 |
| 5,583,961 | A * | 12/1996 | Pawlewski et al. | 704/241 |
| 5,649,060 | A * | 7/1997 | Ellozy et al. | 704/278 |
| 6,304,844 | B1 * | 10/2001 | Pan et al. | 704/257 |
| 6,421,645 | B1 * | 7/2002 | Beigi et al. | 704/272 |
| 6,567,775 | B1 * | 5/2003 | Maali et al. | 704/231 |
| 7,315,813 | B2 * | 1/2008 | Kuo et al. | 704/207 |
| 2004/0199385 | A1 * | 10/2004 | Deligne et al. | 704/235 |

* cited by examiner

*Primary Examiner* — Abul Azad

(57) ABSTRACT

The disclosure describes a speech detection system for detecting one or more desired speech segments in an audio stream. The speech detection system includes an audio stream input and a speech detection technique. The speech detection technique may be performed in various ways, such as using pattern matching and/or signal processing. The pattern matching implementation may extract features representing types of sounds as in phrases, words, syllables, phonemes and so on. The signal processing implementation may extract spectrally-localized frequency-based features, amplitude-based features, and combinations of the frequency-based and amplitude-based features. Metrics may be obtained and used to determine a desired word in the audio stream. In addition, a keypad stream having keypad entries may be used in determining the desired word.

4 Claims, 9 Drawing Sheets

DETECTING SEGMENTS OF SPEECH FROM AN AUDIO STREAM

CROSS-REFERENCE TO RELATED APPLICATIONS

This patent application claims priority to U.S. Provisional Patent Application No. 61/196,552, entitled "System and Method for Speech Recognition Using an Always Listening Mode", by Ashwin Rao et al., filed Oct. 17, 2008, which is incorporated herein by reference.

BACKGROUND INFORMATION

The problem of entering text into devices having small form factors (like cellular phones, personal digital assistants (PDAs), RIM Blackberry, the Apple iPod, and others) using multimodal interfaces (especially using speech) has existed for a while now. This problem is of specific importance in many practical mobile applications that include text-messaging (short messaging service or SMS, multimedia messaging service or MMS, Email, instant messaging or IM), wireless Internet browsing, and wireless content search.

Although many attempts have been made to address the above problem using "Speech Recognition", there has been limited practical success. These attempts rely on a push-to-speak configuration to initiate speech recognition. These push-to-speak configurations introduce a change in behavior for the user and reduce the overall through-put, especially when speech is used for input of text in a multimodal configuration. Typically, these configuration require a user to speak after some indicator provided by the system. For example, a user speaks "after" hearing a beep. The push-to-speak configurations also have impulse noise associated with the push of a button, which reduces speech recognition accuracies.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following disclosure describes a detection technique for detecting speech segments, and words, from an audio stream. The detection technique may be used for speech utterance detection in a traditional speech recognition system, a multimodal speech recognition system, and more generally in any system where detecting a desired speech segment from a continuous audio stream is desired. By way of background, speech recognition is the art of transforming audible sounds (e.g., speech) to text. "Multimodal" refers to a system that provides a user with multiple modes of interfacing with the system beyond traditional keyboard or keypad input and displays or voice outputs. Specifically for this invention, multimodal implies that the system is "intelligent" in that it has an option to combine inputs and outputs from the one or more non-speech input modes and output modes, with the speech input mode, during speech recognition and processing.

Figure 1:
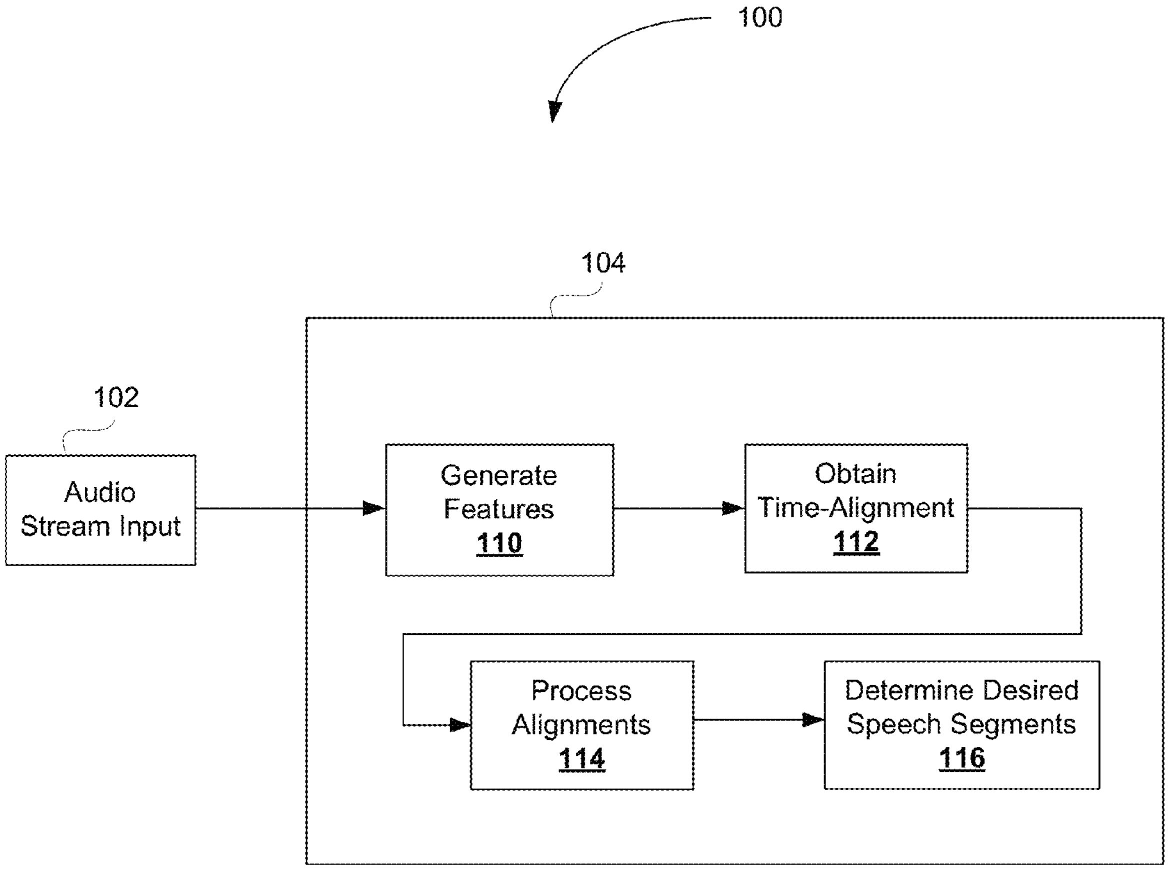
FIG. 1 is a functional block diagram of a speech detection system for determining desired speech in an audio stream.

FIG. 1 is a functional block diagram of a speech detection system 100 for determining desired speech segments in an audio stream. The speech detection system 100 includes an audio stream input 102 and a speech detection technique 104. The speech detection technique 104 may be performed in various ways. In some embodiments, shown in FIGS. 2 and 3, the speech detection technique 104 may be based on pattern matching and may incorporate a traditional speech recognition system for a portion of the technique 104. In other embodiments, shown in FIG. 8, the speech detection technique 104 may be based on signal processing. Additionally, a hybrid system that uses pattern matching and signal processing may be used.

In overview, the speech detection technique 104 in the speech detection system 100 includes several modules that perform different tasks. For convenience, the different tasks are separately identified in FIG. 1. However, one skilled in the art will appreciate that the functionality provided by some of the blocks in FIG. 1 may be combined into one block and/or may be further split into several smaller blocks without departing from the present system. As shown, speech detection technique 104 includes an generate features 110 task, a obtain time-alignment 112 task, a process alignment 114 task, and a determine desired speech-segment 116 task. For the purpose of this discussion, the word phonemes refer to an audio feature that may or/or may not represent a word. Various embodiments for the speech detection system 100 are described below.

Figure 2:
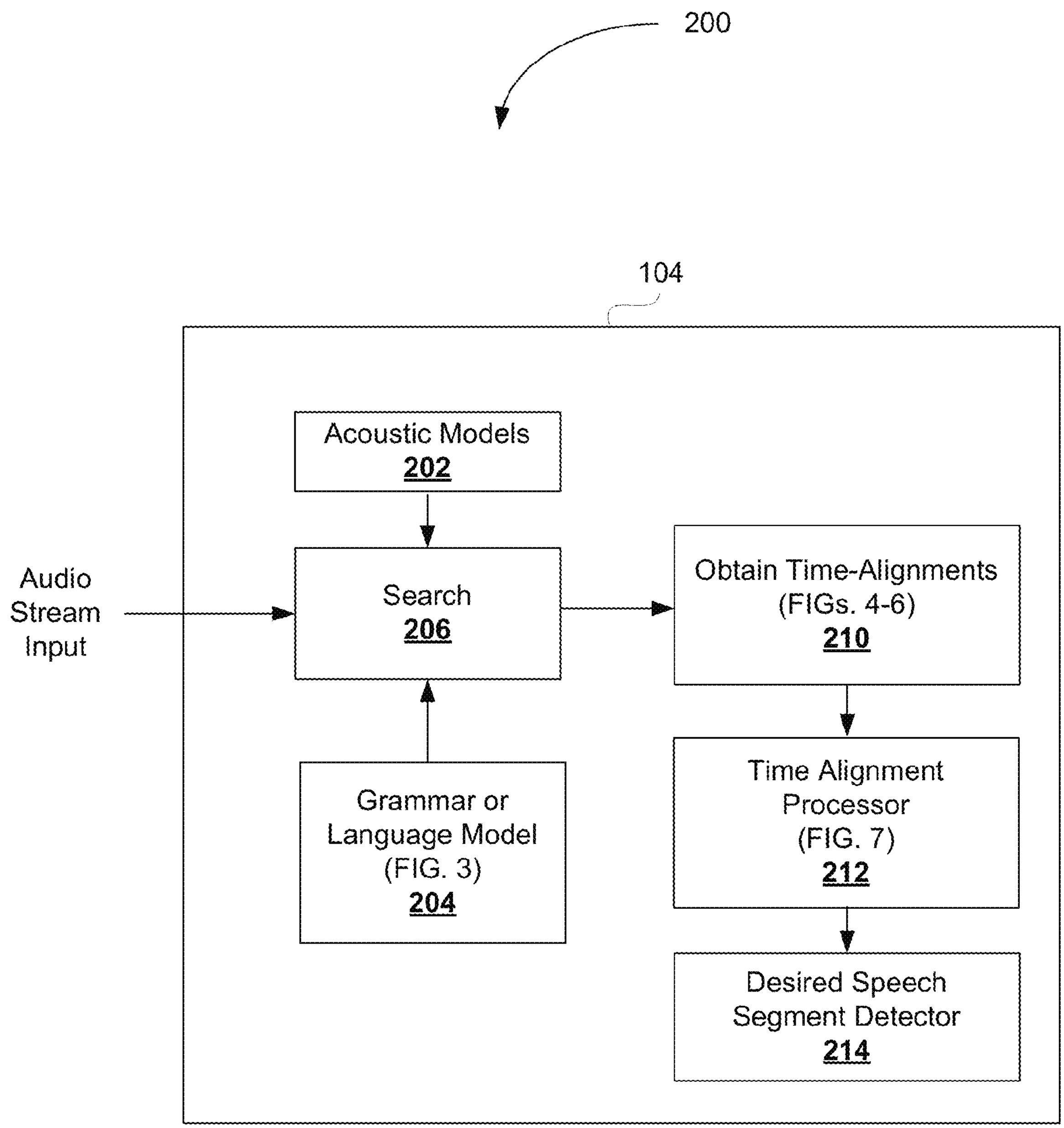
FIG. 2 is one embodiment of the speech detection system of FIG. 1 where audio extraction is based on pattern matching.
Figure 3:
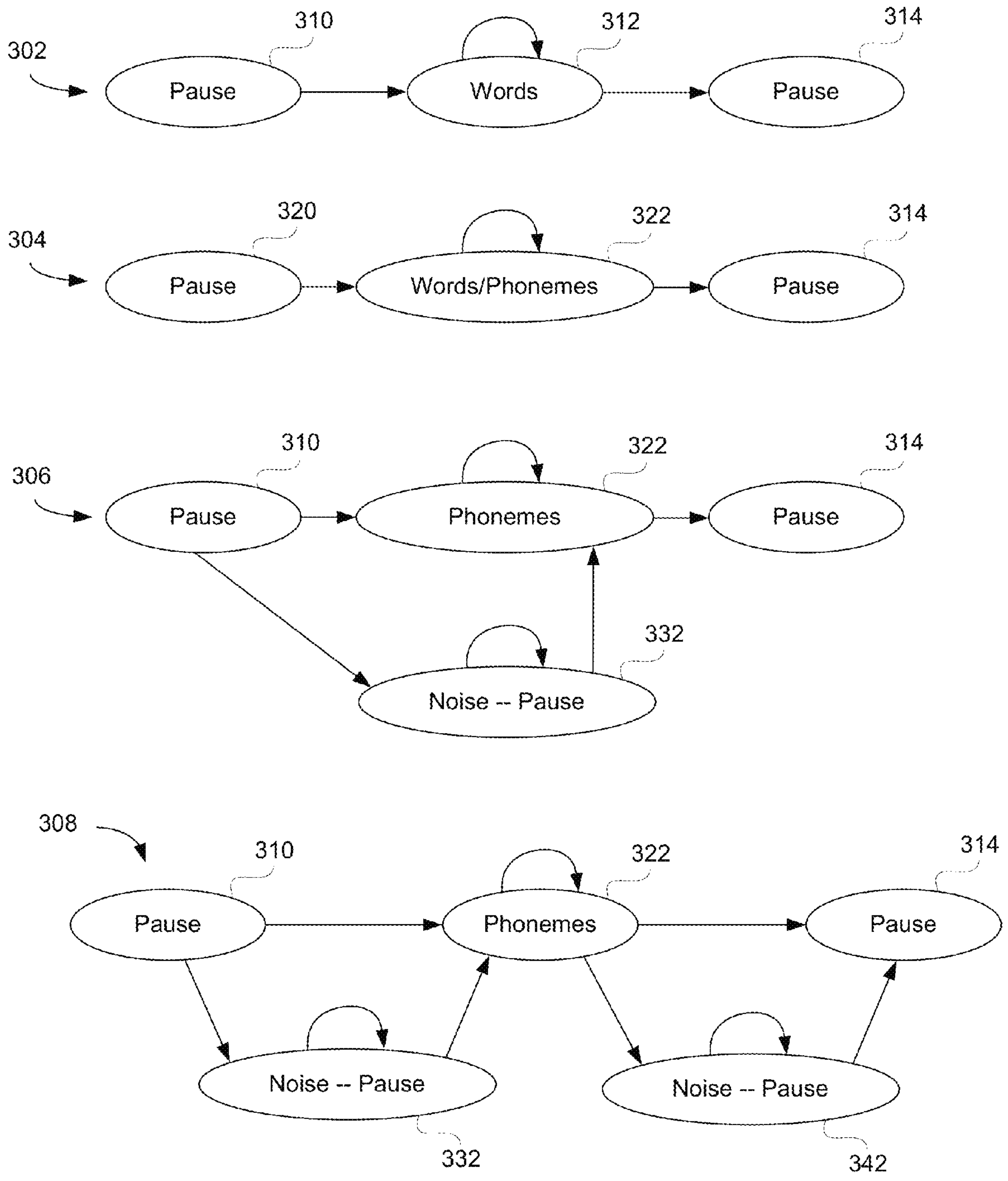
FIG. 3 illustrates several grammar models represented as state diagrams for the pattern matching of FIG. 2.
Figure 4:
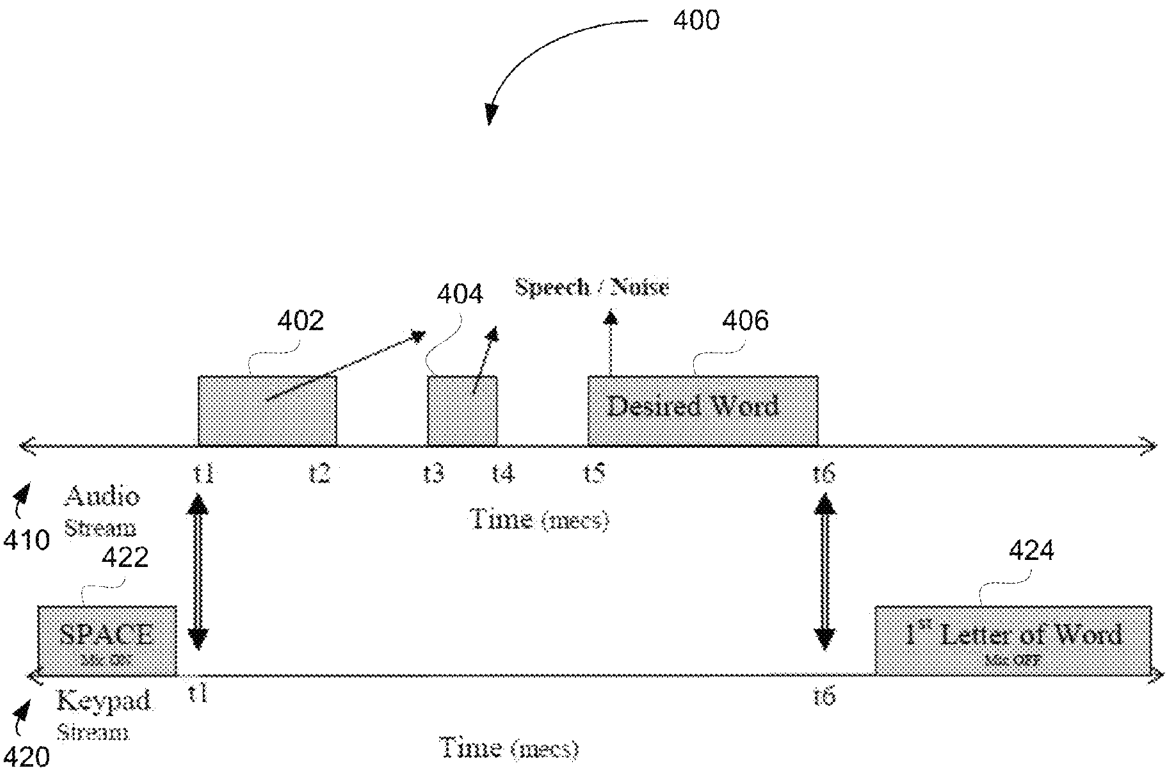
FIG. 4 is a timing diagram illustrating an example of generated time alignments in combination with an input from a keypad stream when a user speaks a word first and then types a first letter.
Figure 5:
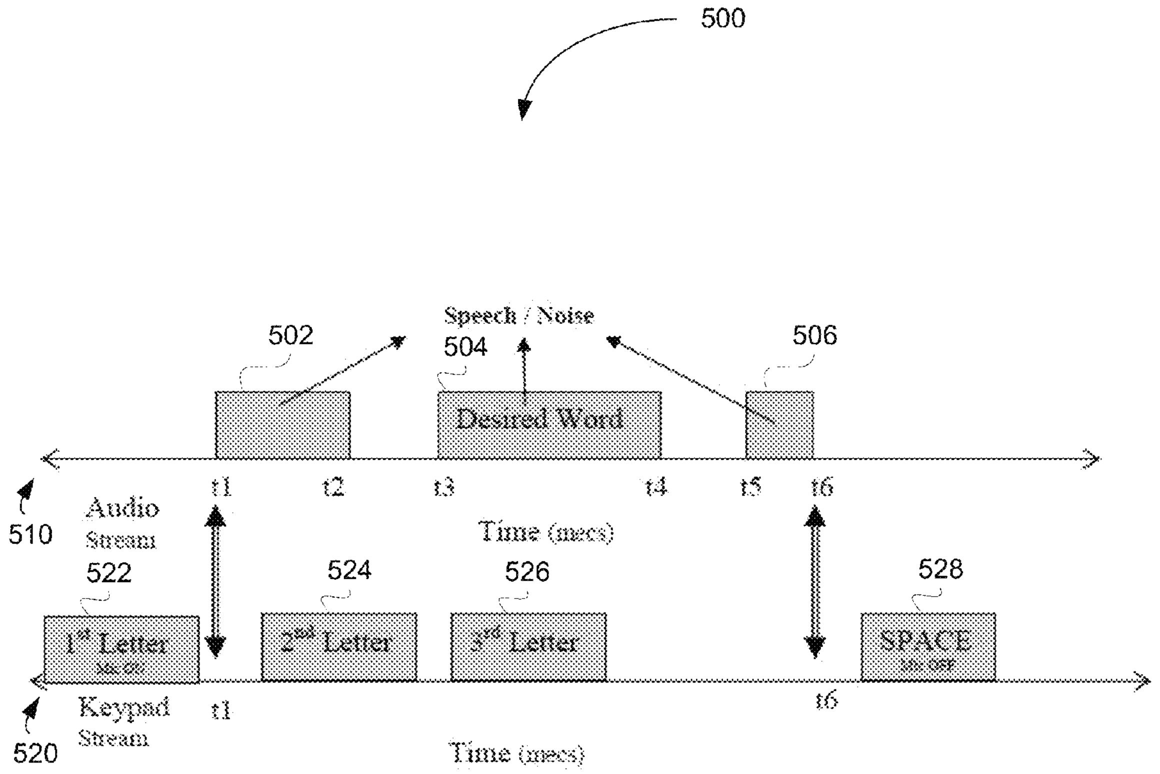
FIG. 5 is a timing diagram illustrating an example of generated time alignments in combination with an input from a keypad stream when a user types a letter first and then speaks a word.
Figure 6:
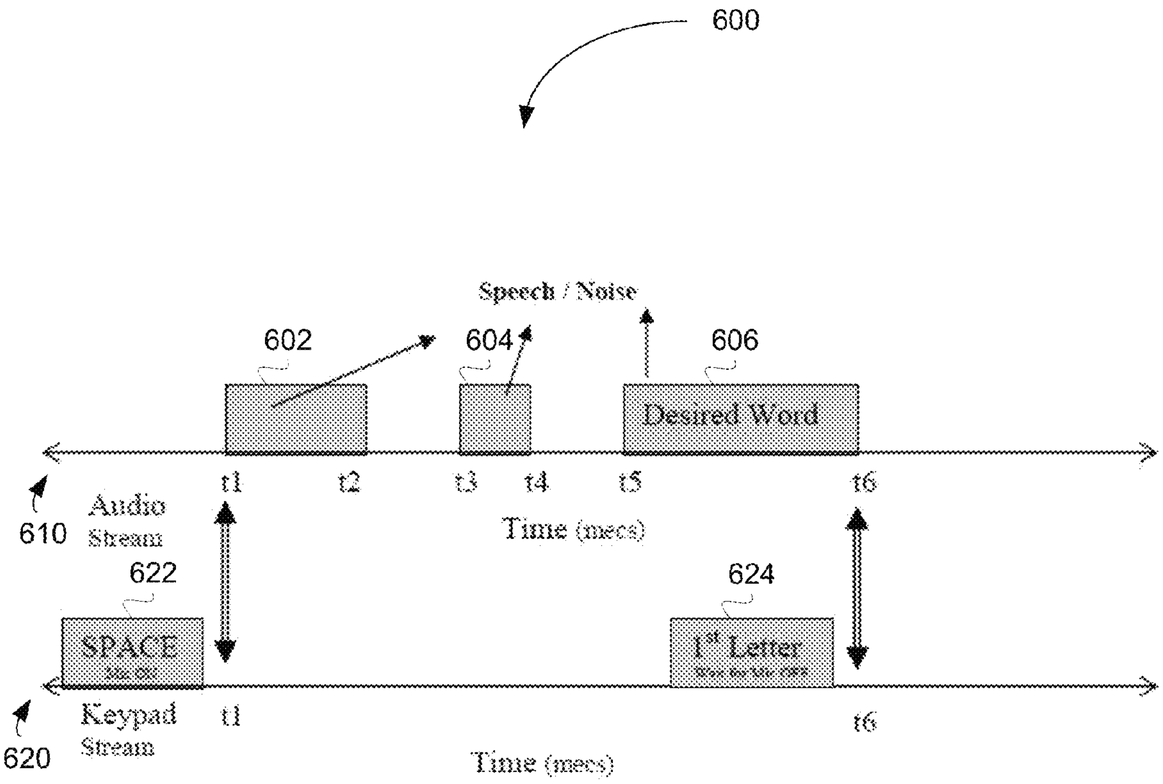
FIG. 6 is a timing diagram illustrating an example of generated time alignments in combination with an input from a keypad stream when a user types a first letter while speaking a word.

FIG. 2 is one embodiment of the speech detection system of FIG. 1 where feature extraction is based on pattern matching. For this embodiment, the speech detection technique 104 may include an acoustic model 202, a search 206, a grammar or language model 204, a module that obtains time-alignment 210, a time alignment processor 212, and a desired speech-segment detector 214. Search 106 may be implemented using standard speech recognition methodologies. However, in contrast with standard speech recognition methodologies, search 206 attempts to generate features that are types of sounds (e.g. phonemes, noise, spikes, fricatives, voiced speech etc) and may not perform traditional speech recognition. In order to generate the features, search 206 accepts input from acoustic model 202 and grammar/language model 204, which may be configured to identify types of speech like speech phonemes, noise phonemes, and so on. One illustrative grammar model is shown in FIG. 3 and will be described later in conjunction with FIG. 3. Once the features have been identified, different time alignments corresponding to these features are obtained 210. FIGS. 4-6 illustrate example timing diagrams for a multimodal system, in combination with an input from a keypad stream, which may further aid identification of desired words. The use of the combination of the keypad stream and the timing diagrams may be applied in multimodal implementations for mobile applications, such as text-messaging, internet browsing, content searches, and the like, especially when the corresponding devices have small form factors. The time-alignments obtained from block 210 are then processed in block 212 to obtain the desired speech in block 214. Details of the various processing that may be performed will now be described.

FIG. 3 illustrates several grammar models represented as state diagrams 302-308 for generating features from the input audio stream. Because the desired speech may be a spoken word which may be accompanied by other audio, such as noise, background speech, and the like, the grammar models used by search 206 task may configure the search 206 task to simply output several types of sounds and their time alignments. For example, state diagram 302 includes three states: pause 310, words 312, and pause 314. Transitions occur from pause 310 to words 312, from words 312 back to words 312, and from words 312 to pause 314. Once the best matching word is determined by Search 206, the corresponding time-alignment information may be output. Grammar 304 is similar to grammar 302, but with word 312 state replaced with word/phonemes 322 state. The advantage of phoneme state is that there is no need to know the application's vocabulary and also phonemes give more detailed breakdown within words. Grammar 306 adds one additional state: noise-pause 332 state which may be transitioned to from pause 310 state. Once in noise-pause 332 state, a transition may occur to word/phonemes 322 state or back upon itself. This may be used in situations wherein the desired speech always occurs at the end of audio stream. In that case, the system may use the in noise-pause 332 state to match anything other than a desired spoken word and the word/Phonemes 322 state may be used to match the desired speech segment. Grammar 308 adds another state to grammar 306. The additional state is another noise-pause 342 state which may be transition to from word/phonemes 322. Once in noise-pause 342 state, a transition may occur to pause 314 or back upon itself. These phoneme/word grammar networks in conjunction with noise models may be used to build the search network for the search task in the traditional speech recognition system. One skilled in the art will recognize that grammars 302-308 may be extended to handle phrases, symbols, and other text depending on the specific application As will be shown in FIGS. 4-6, each time alignment, that is output, has a beginning and an end section that may or may not correspond to one of the desired speech segment. The process for performing time-alignment is now described.

FIG. 4 is a timing diagram 400 illustrating an example of generated time alignments in combination with an input from a keypad stream when a user speaks a word first and then types a first letter. Audio 410 represents the extracted features from the search using the provided grammars. As shown, three time alignments 402, 404, and 406 are identified. Each time alignment has an associated begin time and end time. For example, time alignment 402 begins at t1 and ends at t2. One implementation of the detection technique may be used in an "always listening" configuration within a multimodal system. In this implementation, a keypad stream 420 may be provided to further aid in determining desired words. Timing for the audio stream 410 and the keypad stream 420 are coupled so that key entries may be correlated with the identified features. In one embodiment, markers in the keypad stream may be a <space> key and <typing of letter> to indicate the beginning and end of any particular speech session. Using these markers allows consistency with present mobile interfaces that use text-prediction. However, other markers may be used based on the specific hardware device under consideration.

Timing diagram 400 represents an example of generated time alignments in combination with an input from keypad stream 420 when a user speaks a word first and then types a first letter. In this scenario, the speech segment corresponding to the last feature (e.g., the desired word 406) before the first letter 424 is chosen as the desired speech-segment.

FIG. 5 is a timing diagram 500 illustrating an example of generated time alignments in combination with an input from a keypad stream when a user types a letter first and then speaks a word. Audio 510 represents the extracted features from the search using the provided grammars. As shown, three time alignments 502, 504, and 506 are identified. Keypad stream 520 illustrates entry of a first letter 522 before time t1, a second letter 524 between time t1 and t2, entry of a third letter 526 after time t3, and space key 528 after time t6 to represent the turning of the microphone off. However, one will note, that the actual microphone is still on if in the "always listening" mode. For this timing diagram 500, the time alignment 502, 504, or 506 that is the first to occur after entry of the first letter once the microphone has already been turned on is determined to be the desired speech segment (i.e., time alignment 504). Thus, the desired word 504 occurs right after keypad entry 524.

FIG. 6 is a timing diagram 600 illustrating an example of generated time alignments in combination with an input from a keypad stream when a user types a first letter while speaking a word. Audio 610 represents the extracted features from the search using the provided grammars. As shown, three time alignments 602, 604, and 606 are identified. Keypad stream 620 illustrates keypad entry 622 and 624. Keypad entry 622 corresponds to entry of a <space> key representing the turning on of a microphone. Keypad entry 624 corresponds to an entry of a letter after time t5. In this scenario, the desired word is chosen to be the last spoken word detected, before the first letter. The desired word may extend past the entry of the last letter as shown.

Figure 7:
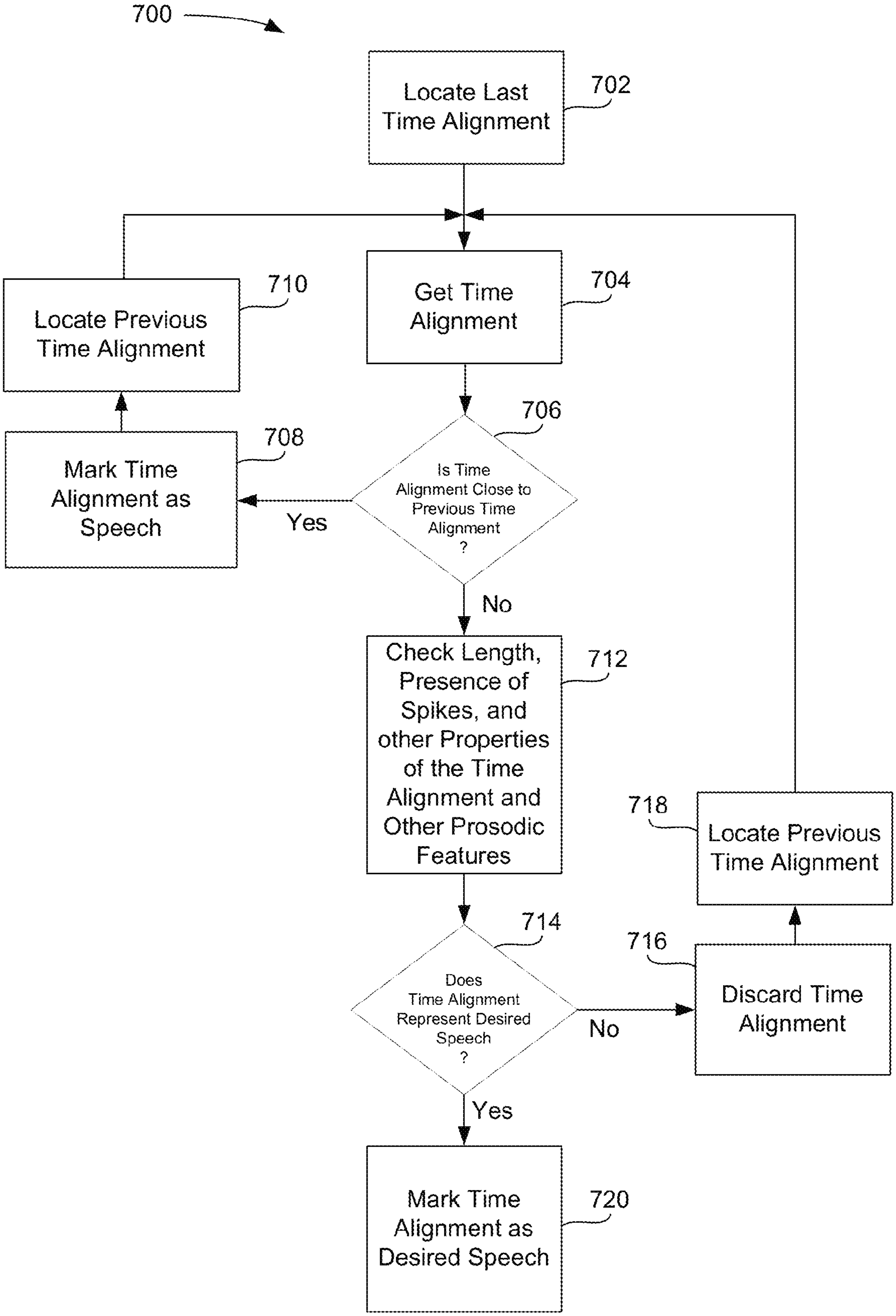
FIG. 7 is a flow diagram illustrating one embodiment for processing time alignments suitable for use in the speech detection system shown in FIG. 1.

FIG. 7 is a flow diagram illustrating one embodiment of a process 700 for processing time alignments suitable for use in the speech detection system shown in FIG. 1. Application specific knowledge may be incorporated into process 700 in order to process the start and end times in the alignments, to yield the audio segment corresponding to the desired speech. In addition, certain constraints may be introduced into process 700. One example constraint may be a segment length. The segment length may be used to determine whether the segment is a valid word. For example, in the English language, words may be assumed to be of ½ second duration and hence if a specific audio segment is below a certain threshold (i.e., ¼ millisecond), then the audio segment may be ignored or combined with a neighboring nearby segment. Thus, the time-alignments are processed based on knowledge of an application's vocabulary (e.g., whether the vocabulary includes words, words with pauses, phrases, length of phrases, symbols, and the like). In addition, time-alignments may be processed based on a priori knowledge of starting letters, an average duration of words for a language being spoken, and others. For example, if the user spoke the word "Yesterday" and then typed the letter "Y", then the knowledge that the desired speech segment has acoustics matching the phonemes that correspond to the pronunciation of words beginning with the letter "Y" may be additionally incorporated.

Those skilled in the art will appreciate that several variations of processing the alignments, based on the proposed framework, may be employed. For example, instead of starting from the last time-alignment, one could start form the first time-alignment. Another example may be to start at the time-alignment that indicates a word with the highest likelihood based on the V_rate and/or C_rate (where V_rate and C_rate will be explained below in conjunction with FIG. 8). In addition, traversing from one time-alignment to the next time-alignment may be performed in either direction.

Example process 700 begins at block 702, where the last time alignment in a specified window is located. Processing continues at block 704.

At block 704, information about the time-alignment is obtained, such as the corresponding start and end time. Processing continues at decision block 706, where a decision is made whether the current time-alignment is close to a previous time alignment. If the current time-alignment is close to the previous time alignment, the feature (recall this could be type of speech as in a word or syllable or phoneme) associated with the time alignment is marked as speech. Processing continues to block 710 to locate the previous time alignment and then back to block 704. If it is determined that the time alignment is not close to a previous time alignment at decision block 706, processing continues at block 712.

At block 712, properties of the time alignment are checked, such as the length, spikes, and other properties corresponding to any prosodic features. Processing continues at decision block 714 where a determination is made whether the time alignment represents the desired speech (in cases where desired speech corresponds to a spoken word, determination is made whether time alignment represents a word). The features may be specific to the application under consideration. If it is determined that the time alignment does not represent desired speech, processing continues to block 716.

At block 716, the time alignment is discarded and processing continues at block 718 to locate a previous time alignment and processing proceeds back to block 704.

Figure 8:
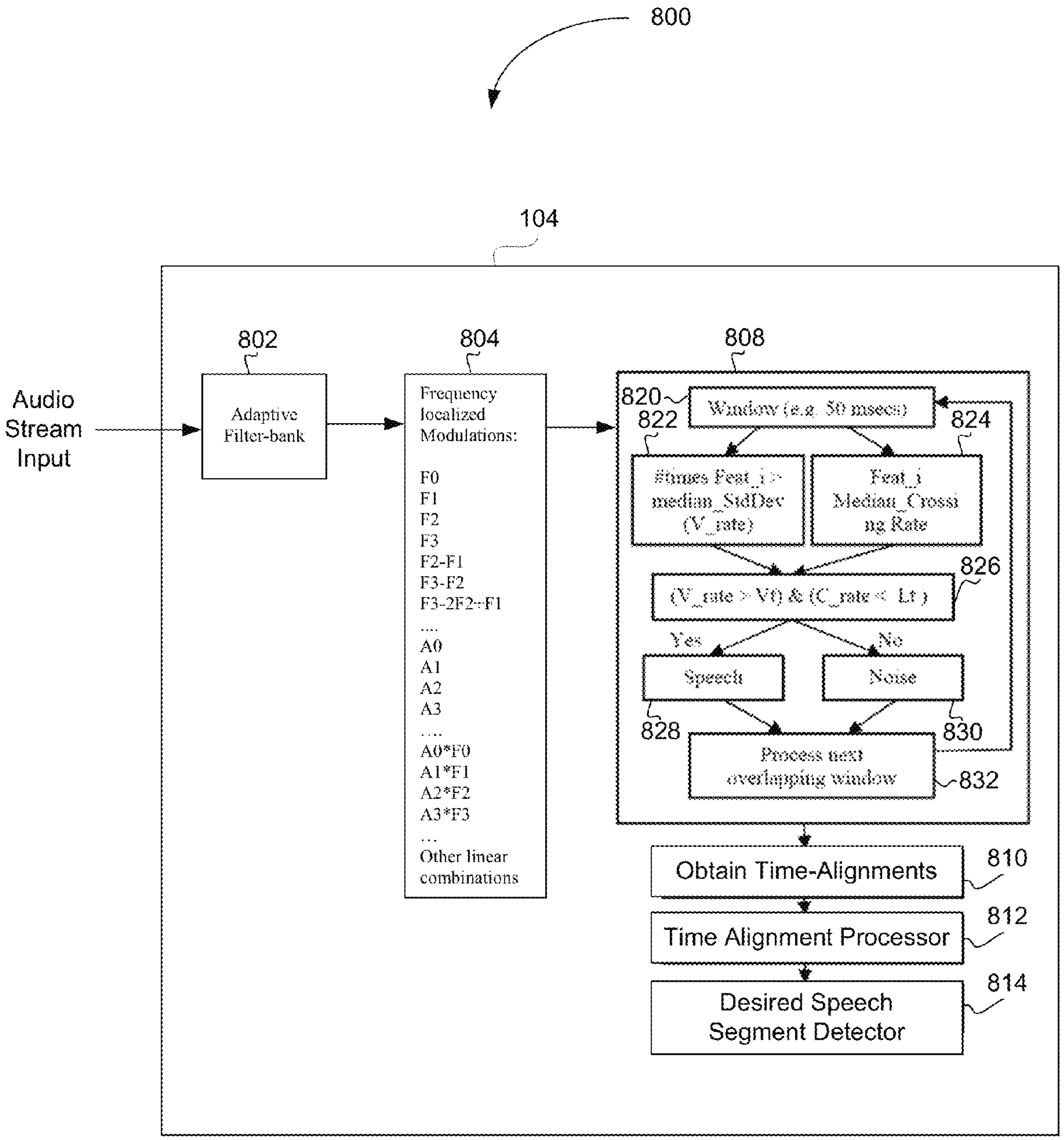
FIG. 8 is another embodiment of the speech detection system of FIG. 1 where the speech extraction is based on signal processing.

If the time alignment is determined to represent the desired speech at decision block 714, processing continues at block 720. At block 720, the time alignment is marked as a desired speech that was detected. This desired speech may then be used for further processing such as speech recognition FIG. 8 is another embodiment of the speech detection system 800 of FIG. 1 where audio extraction is based on signal processing. For this embodiment, speech detection technique 104 may include an adaptive filter-bank 802, a modulation feature extraction 804 component, and speech determination 808 component. The outcome of speech determination 808 component are time alignments, which may be processed by obtain time alignments block 810, time alignment processor 812, and desired speech-segment detector 814 as explained above for the speech detection technique 104 of FIG. 2. By combining the time-alignment generated in FIG. 8 with the processing discussed above in FIGS. 4-7, a more robust estimate may be achieved. The following discussion describes components 802, 804, and 808.

Component 802 (i.e., adaptive filter bank) extracts modulation features from speech. One embodiment of an adaptive filter bank for extracting modulation features is described in an article entitled "On Decomposing Speech into Modulated Components", by A. Rao and R. Kumaresan in IEEE Transactions on Speech and Audio Processing, Vol. 8, No. 3, May 2000. In overview, the adaptive filter bank uses a Linear Prediction (in spectral sub-band) spectral analysis to capture slowly varying gross details in the signal spectrum (or formants) and uses temporal analysis to extract other modulation around those gross details (or spectral formants). The output of component 802 is input to component 804.

Component 804 (i.e., modulation feature extraction component) obtains individual features and/or features formed using linear combination of individual modulation features. In contrast with prior systems, which mostly use amplitude-based features, component 804 uses spectrally-localized frequency based features, amplitude based features, and combinations of frequency based and amplitude based features. By using frequency based features, the features are normalized due to the sampling frequency and their values may be correlated with phonetic information in sounds. For example, while the F2 feature alone is known to be the second formant in speech that carries most of the intelligibility information, the inventors, by using combinations of the different features, have developed metrics that help distinguish different types of sounds and also separate them from noise. These metrics may then be used to better determine which time alignments correspond to the desired speech.

As shown in FIG. 8, component 804 obtains frequency-based features F0-F3, commonly referred to as formants. In addition, component 804 may use various combinations of these frequency-based features, such as F2-F1, F3-F2, and F3-2F2+F1, and the like. Each of this combination may also be a log, division, or the like. Component 804 may also obtain amplitude-based features, such as A0-A3. The inventors then combine the frequency-based features and the amplitude-base features to obtain other helpful features, such as A0*F0, A1*F1, A2*F2, and A3*F3. Those skilled in the art after reading the present application will appreciate that other linear and non-linear combinations may also be obtained and are envisioned by the present application. These features then code phonetic information in sounds. For example, F3-2F2+F1 conveys information about the spacing between neighboring formats. By using these features, the present detection technique may capture the importance of spacing changes that occur over time during speech due to vocal cavity resonances that occur while speaking. Likewise, the feature distinguishes silence or relatively steady noise which has a more constant spacing. Further, component 804 processes the modulation features over time to generate metrics that indicate the variation of the amplitudes of these modulations (over time) and the frequency content in the modulations. Both metrics may be measured relative to the median of the specific modulation. The metrics are measured by processing overlapping windows of modulation features; the processing itself may be either done real-time or non-real-time. Those skilled in the art will appreciate that several variations of process 700 may be considered, including combination of features using discriminant analysis or other pattern recognition techniques; implementation using a sample-by-sample or a batch processing framework; using normalization techniques on the features, and the like. One example of process 808 will now be described.

At block 820, a window of time may be used to determine the features. The duration of the window may be any time period. FIG. 8 illustrates a window of 50 msecs. Each features specified in block 804 may be analyzed over this window. At block 822, the number of times the feature is (consecutively or otherwise) greater than the median standard deviation (V_rate) is determined for each feature. At block 824, the median crossing rate for each feature (C_rate) is determined. In other words, C_rate is the number of times the feature crosses the median. At block 826, the results of block 822 and 824 are input to determine an indicator of speech/noise-silence using (V_rate>Vt) & (C_rate<Lt) where Vt and Ct are threshold values for the V_rate and C_rate, respectively. Those skilled in art will appreciate that several the median may be replaced by one of several other metrics including sample means, weighted averages, modes and so on. Likewise, the median crossing may be replaced by other level-crossing metrics. The threshold may be pre-determined and/or adapted during the application. The thresholds may be fixed for all features and/or may be different for some or all of the features. Based on the analysis, the results are either block 828 denoting speech or block 830 denoting noise. The outputs are stored and the process moves to the next block 832 where an overlapping window is obtained and proceeds to block 820 for processing as described above. Once the windowed audio segments have been processed, the stored indicators are combined with the time-location of the windows to yield a time-alignment of the audio. The alignment is then combined with other features and processed to yield the final begin and end of the desired speech segment as explained in FIGS. 4-7 above.

Those skilled in the art will appreciate that several different ways of implementing the present detection technique may be done. In addition, the present detection technique may be generalized to address any text (phrases, symbols, and the like), and form of speech (discrete, continuous, conversational, spontaneous), any form of non-speech (background noise, background speakers, and the like) and any language (European, Mandarin, Korean, and the like).

Certain of the components described above may be implemented using general computing devices or mobile computing devices. To avoid confusion, the following discussion provides an overview of one implementation of such a general computing device that may be used to embody one or more components of the system described above.

Figure 9:
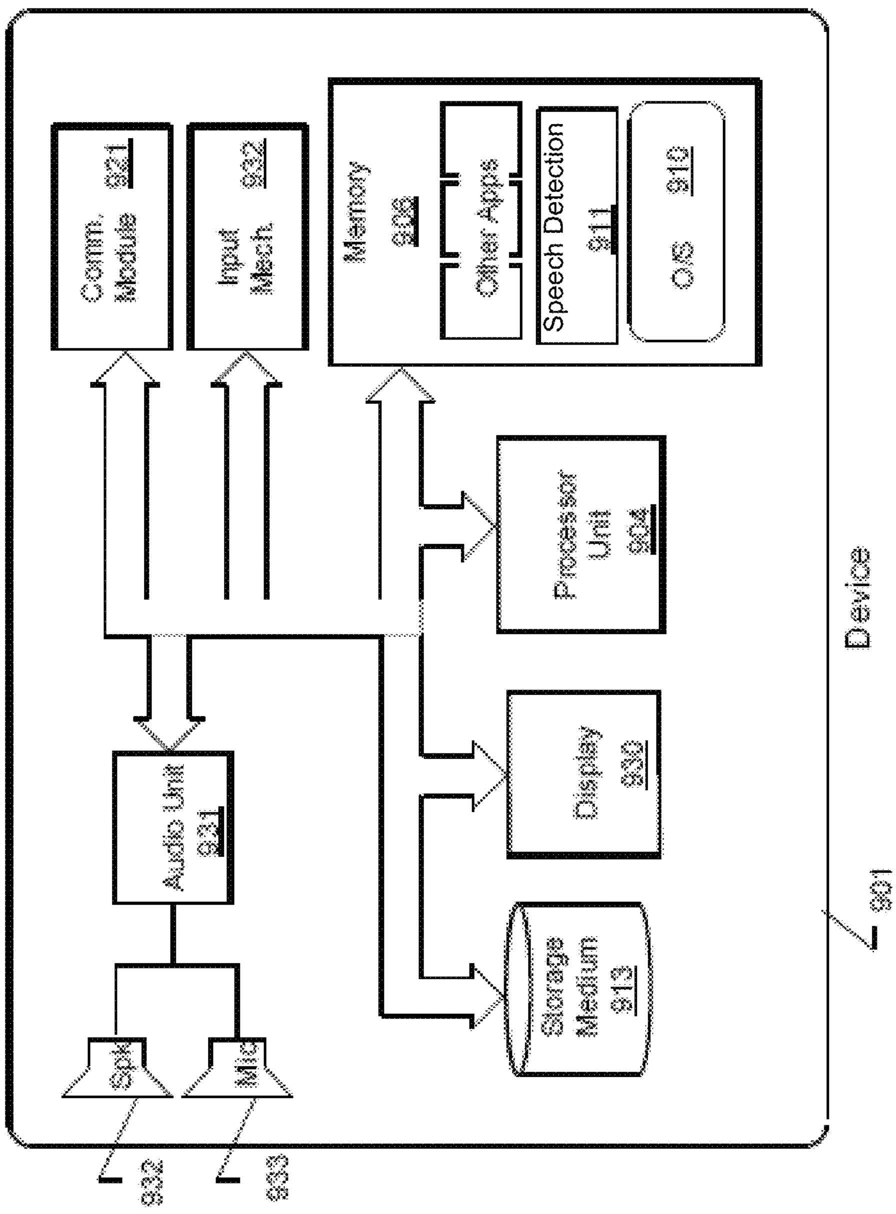
FIG. 9 is a functional block diagram representing a computing device for use in certain implementations of the disclosed embodiments or other embodiments of the word detection technique.

FIG. 9 is a functional block diagram representing a computing device for use in certain implementations of the disclosed embodiments or other embodiments of the word detection technique. The mobile device 901 may be any handheld computing device and not just a cellular phone. For instance, the mobile device 901 could also be a mobile messaging device, a personal digital assistant, a portable music player, a global positioning satellite (GPS) device, or the like. Although described here in the context of a handheld mobile phone, it should be appreciated that implementations of the invention could have equal applicability in other areas, such as conventional wired telephone systems and the like.

In this example, the mobile device 901 includes a processor unit 904, a memory 906, a storage medium 913, an audio unit 931, an input mechanism 932, and a display 930. The processor unit 904 advantageously includes a microprocessor or a special-purpose processor such as a digital signal processor (DSP), but may in the alternative be any conventional form of processor, controller, microcontroller, state machine, or the like.

The processor unit 904 is coupled to the memory 906, which is advantageously implemented as RAM memory holding software instructions that are executed by the processor unit 904. In this embodiment, the software instructions stored in the memory 906 include a speech detection technique 911, a runtime environment or operating system 910, and one or more other applications 912. The memory 906 may be on-board RAM, or the processor unit 904 and the memory 906 could collectively reside in an ASIC. In an alternate embodiment, the memory 906 could be composed of firmware or flash memory.

The storage medium 913 may be implemented as any nonvolatile memory, such as ROM memory, flash memory, or a magnetic disk drive, just to name a few. The storage medium 913 could also be implemented as a combination of those or other technologies, such as a magnetic disk drive with cache (RAM) memory, or the like. In this particular embodiment, the storage medium 913 is used to store data during periods when the mobile device 901 is powered off or without power. The storage medium 913 could be used to store contact information, images, call announcements such as ringtones, and the like.

The mobile device 901 also includes a communications module 921 that enables bi-directional communication between the mobile device 901 and one or more other computing devices. The communications module 921 may include components to enable RF or other wireless communications, such as a cellular telephone network, Bluetooth connection, wireless local area network, or perhaps a wireless wide area network. Alternatively, the communications module 921 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 931 is a component of the mobile device 901 that is configured to convert signals between analog and digital format. The audio unit 931 is used by the mobile device 901 to output sound using a speaker 932 and to receive input signals from a microphone 933. The speaker 932 could also be used to announce incoming calls.

A display 930 is used to output data or information in a graphical form. The display could be any form of display technology, such as LCD, LED, OLED, or the like. The input mechanism 932 may be any keypad-style input mechanism. Alternatively, the input mechanism 932 could be incorporated with the display 930, such as the case with a touch-sensitive display device. Other alternatives too numerous to mention are also possible.

The claimed invention is:

1. A computer-implemented speech detection method for detecting desired speech segments in an audio stream, the method comprising:

a) generating a plurality of features from an audio stream;

b) obtaining a plurality of time-alignments based on the features;

c) processing the plurality of time-alignments;

d) determining a desired speech segment based on the plurality of time-alignments;

e) determining whether there is at least one non-desired speech segment; and f) outputting an output stream that includes the desired speech segment and omits the at least one non-desired speech segment, wherein generating the plurality of features comprises performing signal processing on the audio stream and analyzing overlapping or non-overlapping windows of the audio stream to gather at least one metric on the plurality of features, wherein the at least one metric comprises a number of times the feature is greater than a median standard deviation determined for the feature.

2. A computer-implemented speech detection method for detecting desired speech segments in an audio stream, the method comprising:

a) generating a plurality of features from an audio stream;

b) obtaining a plurality of time-alignments based on the features;

c) processing the plurality of time-alignments;

d) determining a desired speech segment based on the plurality of time-alignments;

e) determining whether there is at least one non-desired speech segment; and f) outputting an output stream that includes the desired speech segment and omits the at least one non-desired speech segment, wherein generating the plurality of features comprises performing signal processing on the audio stream and analyzing overlapping or non-overlapping windows of the audio stream to gather at least one metric on the plurality of features, wherein the at least one metric comprises a number of times the feature is greater than a standard deviation determined for the feature.

3. The computer-implemented speech detection method of claim 2, wherein the at least one metric comprises the number of times the feature is greater than a median determined for the feature.

4. The computer-implemented speech detection method of claim 2, wherein the at least one metric relates to a spread for the feature.

* * * * *